UNITED STATES PATENT OFFICE.

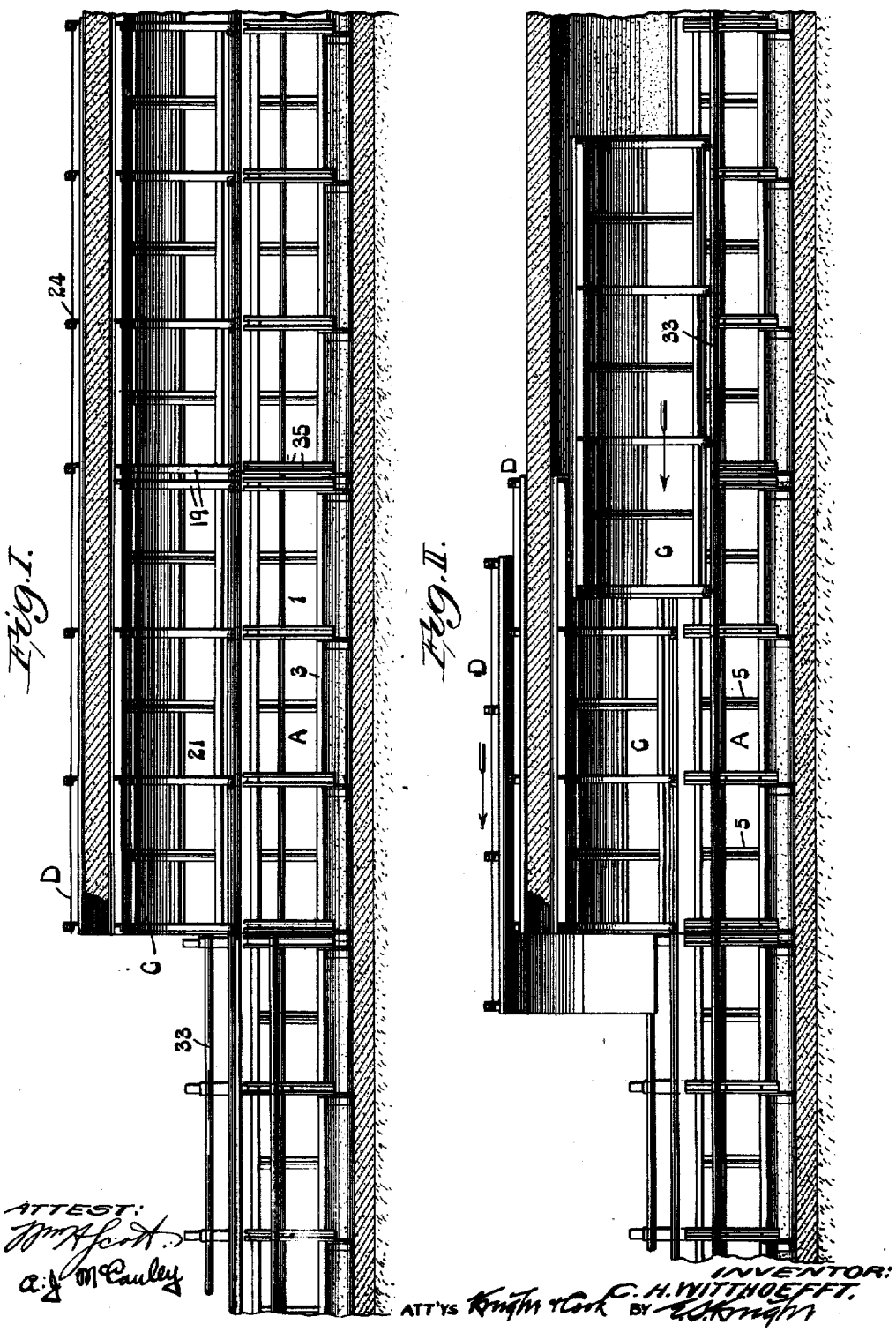

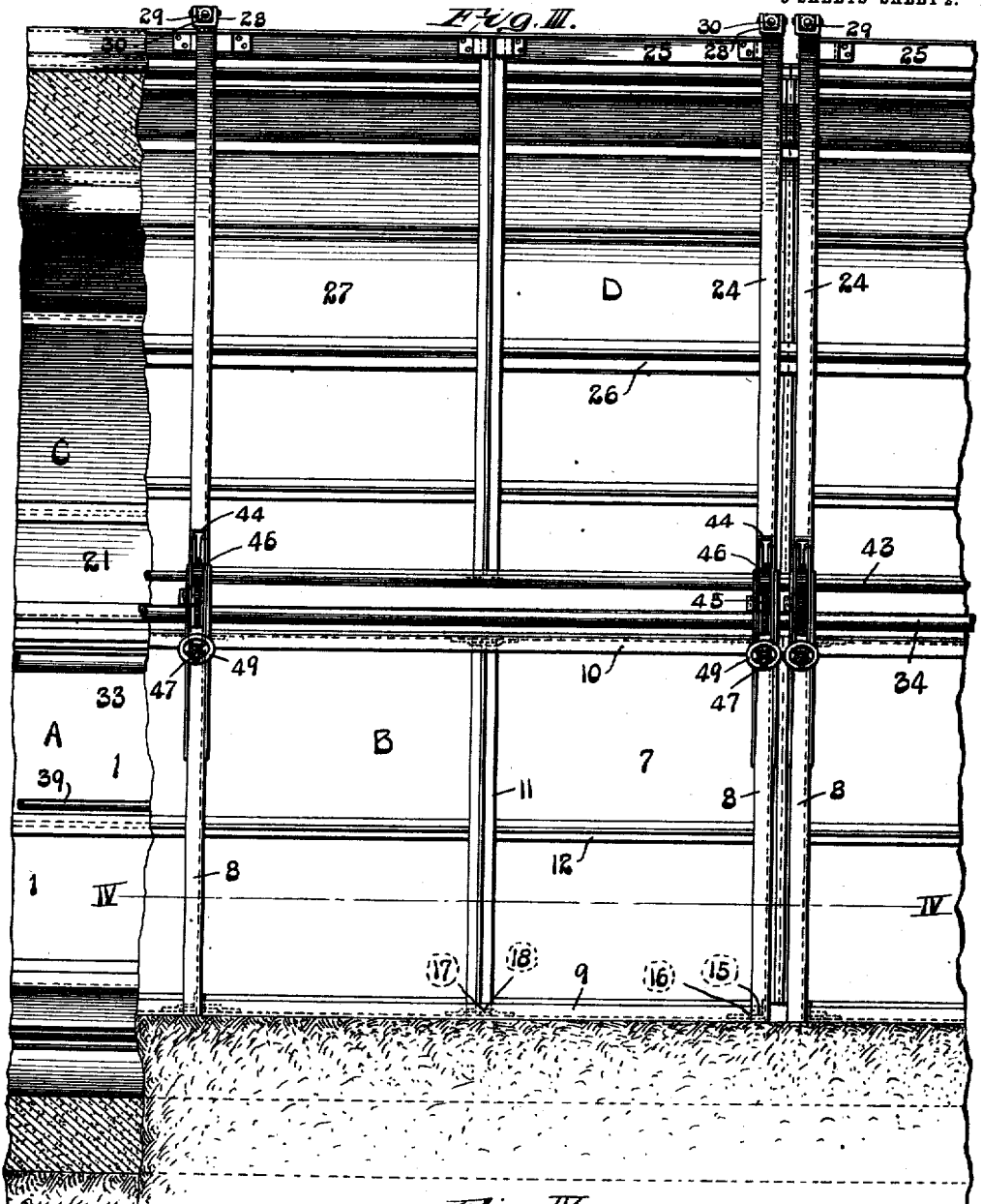

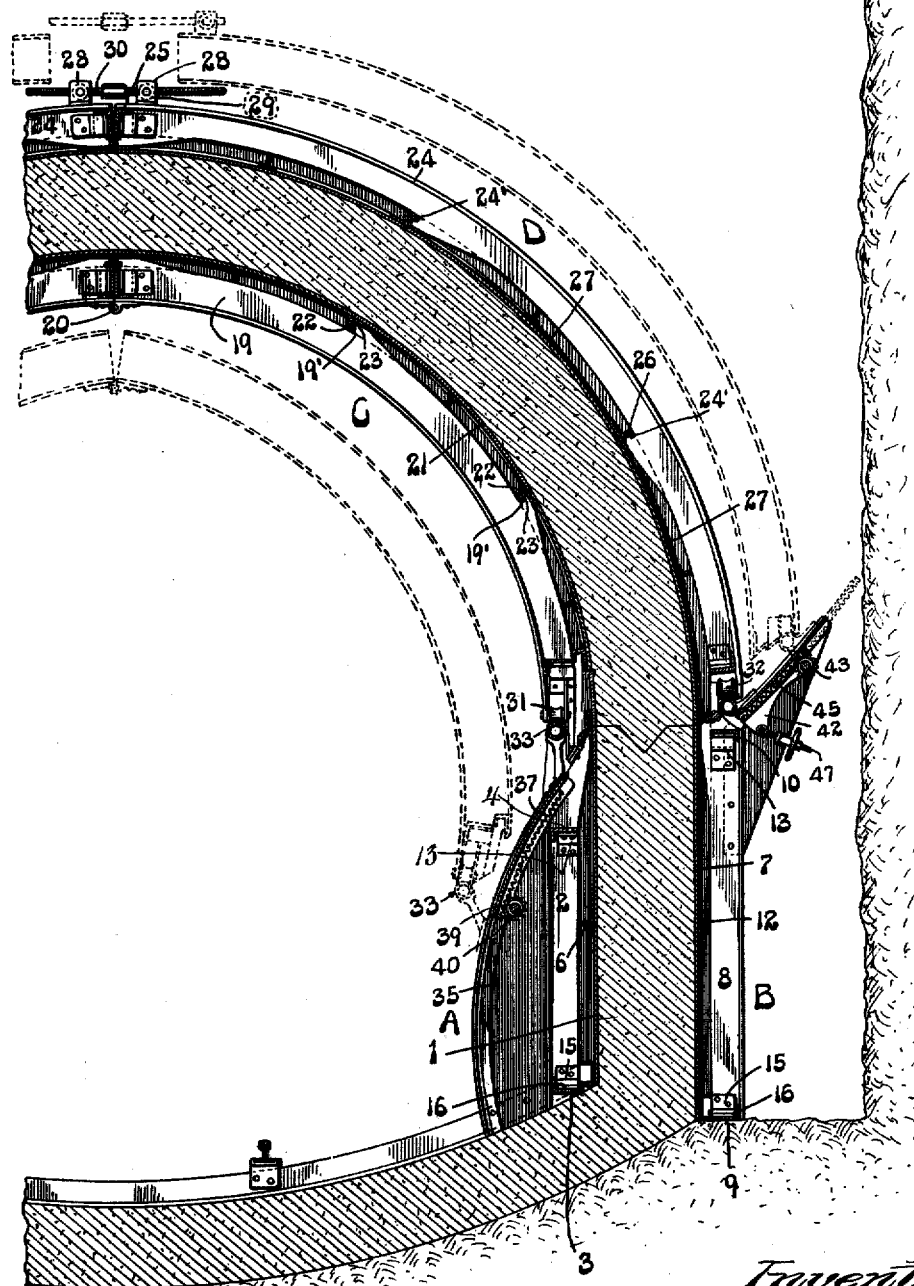

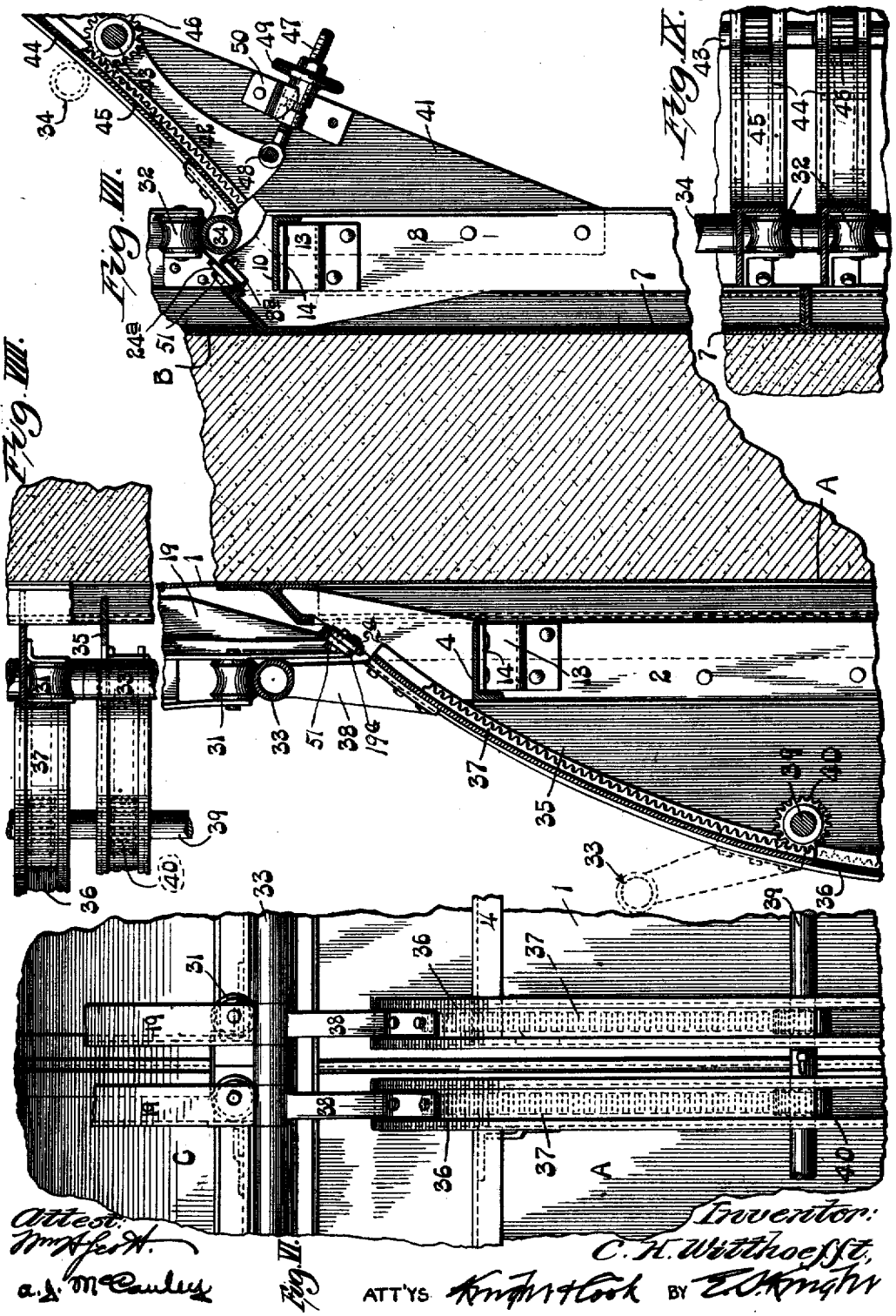

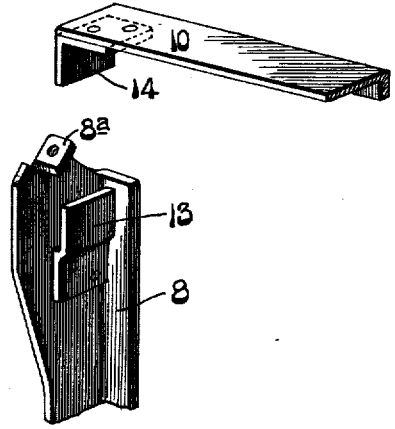
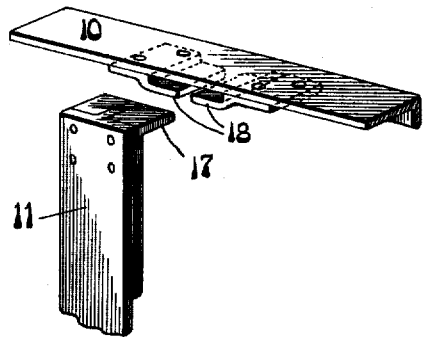
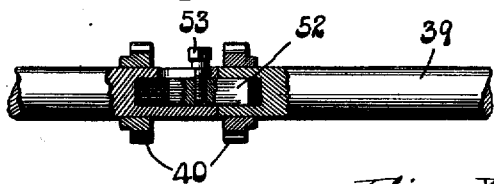
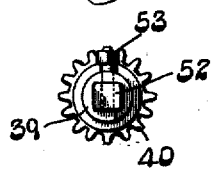
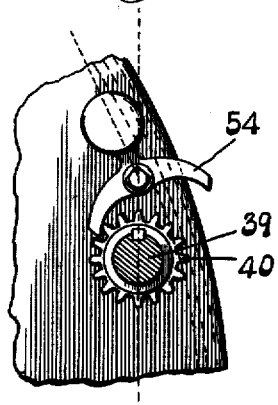

CHARLES H. WITTHOEFFT, OF ST. LOUIS, MISSOURI, ASSIGNOR TO WITTHOEFFT COLLAPSIBLE CONCRETE FORMS COMPANY, OF ST. LOUIS, MISSOURI, A CORPORATION.

CONCRETE-TUNNEL-MOLDING APPARATUS.

1,004,615.	Specification of Letters Patent.	Patented Oct. 3, 1911.

Application filed November 17, 1910. Serial No. 592,787.

*To all whom it may concern:*

Be it known that I, CHARLES H. WITTHOEFFT, a citizen of the United States of America, residing at the city of St. Louis, in the State of Missouri, have invented certain new and useful Improvements in Concrete-Tunnel-Molding Apparatus, of which the following is a full, clear, and exact description, reference being had to the accompanying drawings, forming part of this specification.

My invention relates to an apparatus for molding concrete tunnels or sewers.

The principal object of the present improvement is the construction of an apparatus of this kind in which the upper or arch molding sections are so supported as to be movable longitudinally of the apparatus, and the provision of vertically movable trackways on which the arch molding sections are transferred from point to point above the lower wall molding sections as the molding operations progress.

Figure I is a longitudinal section of a partially molded tunnel and my molding apparatus. Fig. II is a view similar to Fig. I, showing mold members moved from their positions of utility on the ways providing for their movement. Fig. III is an enlarged view in part a side elevation of the outer mold, and in part an elevation of the inner mold. Fig. IV is a longitudinal section taken on line IV—IV, Fig. III. Fig. V is an enlarged vertical cross section through the tunnel and mold. Fig. VI is an enlarged elevation of portions of the mold and the vertically movable track rails for supporting and guiding the upper mold sections. Fig. VII is an enlarged vertical cross section through the molding apparatus at the location of the track rails and the rail lowering and raising mechanisms. Fig. VIII is in part a plan or top view of the track rail raising and lowering mechanism of the inner mold and in part a horizontal section member of the inner mold. Fig. IX is a plan or top view of the raising and lowering mechanism of the outer mold, with members of the outer mold in horizontal section. Figs. X and XI are perspective views of the upright and horizontal supports for the mold plates and movable mold sections. Fig. XII is in part an elevation and in part a longitudinal section of one of the sectional shafts of the raising and lowering mechanism. Fig. XIII is an end view of the sectional shaft sections, the coupling member therein and pinion thereon. Fig. XIV is an elevation of one of the detents engaging pinions on the shafts of the raising and lowering mechanisms.

In the accompanying drawings: A designates the inner wall mold sections and B the outer wall mold sections of my tunnel molding apparatus. The inner wall mold sections A comprise, in the main, mold plates 1, backing posts 2 therefor, bottom and top connecting bars 3 and 4, intermediate backing posts 5, and horizontal reinforcing bars 6 midway between the top and bottom connecting bars. The outer wall mold sections are similar in structure to the sections A and comprise, in the main, mold plates 7, backing posts 8, bottom and top connecting bars 9 and 10, intermediate backing posts 11, and horizontal reinforcing bars 12.

No invention is herein claimed for the structure of the wall mold sections A and B, aside from the particular means whereby the top and bottom connecting bars of the sections are detachably united to the main and intermediate posts of the sections. These features are shown in Figs. III, IV, V, X, and XI.

13 are socket brackets secured to the main posts of the sections at their upper ends and at the ends of the top connecting bars of the sections are tongues 14, which seat in said socket brackets 13 to provide for the attachment of said members to each other. At the bottom ends of the main posts are tongues 15 that enter into sockets 16 on the bottom connecting bars to unite said connecting bars and posts. The intermediate posts of the wall mold sections are provided at their ends with tongues 17 which seat in sockets 18 arranged in pairs, and attached to the top and bottom connecting bars, thereby tying such parts.

I will next proceed to the description of the arch mold elements of my tunnel molding apparatus, in which C designates the inner sections of the arch mold and D the outer sections of the arch mold. Each inner arch mold section includes curved carriers 19 hinged at 20 to the carriers of the opposite section or companion section. The carriers in each section are connected by upper and lower tie-bars which have socket and tongue attachment similar to the socket and tongue attachment of the posts and connecting bars of the wall sections of the molding apparatus. As seen in Fig. V, the carriers 19 are provided at their upper edges with notches 19'.

21 designates arch mold plates supported by the carriers 19 of the inner arch mold sections. These mold plates are arranged in series, one above another in arcs of circles, and they have secured to them at their upper and lower meeting edges locking bars 22 and 23. The locking bars are of angular shape and lipped so that they interlock, as seen in Fig. V, and each interlocking pair of bars enter combinedly into notches 19' in the carriers 19, thereby securing the mold plates to the carriers.

The upper arch mold sections D comprise curved carriers 24 corresponding in contour to the contour of the carriers of the inner arch sections C and connected by tie bars 25 attached to the carriers in a manner similar to the attachment of the tie bars to the carriers of the inner arch sections. In the carriers of the outer arch mold sections are notches 24' that receive the locking bars 26 of the outer section mold plates 27. The upper arch mold sections are arranged in pairs transversely of the tunnel molding apparatus and abut against each other at their top edges. For the purpose of connecting the upper ends of the sections and holding them in proper relative positions, I use devices of the following description:

28 are nut holding boxes secured to the carriers 24 and in which nuts 29 are pivotally mounted.

30 are screw rods each having a right hand thread at one end and a left hand thread at the other end. The reversely threaded ends of these screw rods are operable in nuts 29 opposing each other on mating upper arch mold sections. It will be readily understood that when the screw rods 30 are turned in one direction, they will act to draw the mold sections into close abutting relation and provide for the maintenance of them in arch shape. It will further be seen that an opposite turning of the screw rods 30 results in separation of the upper ends of the upper arch mold sections, thereby permitting them to be elevated to the positions indicated in dotted lines, Fig. V.

31 designates track wheels journaled to the carriers 19 of the inner arch mold sections, and 32 are track wheels journaled to the carriers 24 of the outer arch mold sections. These wheels are adapted to ride upon track rails provided therefor for the transference of the arch mold sections from point to point in the molding of a tunnel.

33 and 34 are track rails on which the track wheels 31 and 32 operate. These track rails extend longitudinally of the molding apparatus and serve to support and guide the arch mold sections when they are transferred from point to point, as previously referred to.

35 designates plates, (see Figs. V and VI to VIII, inclusive), secured to the backing post 2 of the wall molding sections. These plates are provided with guideways 36.

37 are rack bars arranged in the guideways 36 and movable vertically therein. These rack bars are provided at their upper ends with posts 38 to which the track rails 33 are secured.

39 designates a rack operating shaft composed of sections mounted in the plates 35 and having rigidly mounted thereon pinions 40 that mesh with the rack bars 37. It will be apparent that when the rack bars are lowered by the operation of the shaft 39, the track rail 33 will move downwardly and that when the rack bars are moved in the opposite direction or upwardly, the track rail 33 will be carried to a desired elevation.

41 designates brackets secured to the backing posts of the outer wall molding sections of my apparatus, and 42 designates hangers pivotally supported by a shaft 43 mounted in the brackets 41 and similar to the shaft 39 supporting the hangers 42 of the inclined guideways 44.

45 are rack bars operable in the guideways 44 and to which the track rails 34 are secured. The shaft 43 is provided with pinions 46 in mesh with the rack bars 45, and it will therefore be understood that when the shaft is rotated, the rack bars will be moved upwardly or downwardly according to the direction of rotation of the shaft, and the track rail 34 will partake of movement corresponding to that partaken of by the rack bars. The pivotally mounted hangers 42 are upheld at their lower ends by supporting screw rods 47 pivoted to the hangers at 48, and mounted in shift nuts 49 loosely arranged in boxes 50 fixed to the brackets 41. Upon the operation of the shaft 43 the rack bars 45 and the rails 34 are elevated from the position seen in full lines to the position seen in dotted lines Fig. V, thereby elevating the mold sections D away from a concrete arch that has been molded beneath them, in order that they may be conveyed longitudinally of the mold. The operation of the parts just described to position the mold sections D supported by the track rails 34 is the reverse of that set forth to elevate the sections.

The object in pivotally mounting the hangers 42 that support the rack bars 45 and track rails 34 is to provide for said track rails being lowered away from the track wheels carried by the mold sections D and elevated independently of said sections to receive mold sections to be conveyed past those in molding positions. When the track rails are to be elevated for this purpose, the shift nuts 49 are operated on the hanger supporting rods 47 to permit downward movement of the hangers and rails, while the mold sections are supported by the backing posts 8 in a manner to be explained. After the track rails have been lowered to clear them from the track wheels of the mold sections, the rails are elevated through the medium of the shafts 43 and rack bars 45 for the utility mentioned.

To provide for the support of the mold sections of my apparatus when the track rails 33 and 34 are moved from positions beneath said sections for the transfer of sections being moved from point to point, the backing posts 2 and 8 are, respectively, provided at their upper ends with perforated seat ears 2ª and 8ª. The carriers 19 and 24 of the mold sections C and D are, respectively, provided at their lower ends with foot ears 19ª and 24ª that are adapted to rest on the seat ears 2ª and 8ª, and be held thereto by removable pins 51.

The rack bar operating shafts 39 and 43 are made up of sections corresponding substantially to the lengths of the mold sections C and D and these sections are preferably united, as shown in Fig. XII, by connecting blocks 52 slidable in the sections and held by set screws 53.

54, see Fig. XIV, is one of the detents for engagement with the pinions on the shafts 39 and 43 to hold said shafts from accidental rotation.

I claim:—

1. In a concrete tunnel mold, movable arch mold sections, track rails on which said arch sections may be conveyed longitudinally of the mold, and means for lowering and raising said track rails.

2. In a concrete tunnel mold, movable arch mold sections, track rails on which said arch sections may be conveyed longitudinally of the mold, and rack and pinion mechanism for lowering and raising said track rails.

3. In a concrete tunnel mold, movable arch mold sections, track rails on which said arch sections may be conveyed longitudinally of the mold, racks by which said track rails are carried, shafts extending longitudinally of the mold, and pinions carried by said shafts meshing with said racks.

4. In a concrete tunnel mold, lower mold sections, movable arch mold sections above said lower sections, track rails on which said arch sections may be conveyed longitudinally of the mold, means for moving said rails away from said arch sections; said lower mold sections being provided with means for supporting said arch sections when said track rails are separated therefrom.

5. In a concrete tunnel mold, movable arch mold sections hinged to each other at their upper ends, and vertically movable tracks on which said arch sections may be conveyed longitudinally of the mold.

6. In a concrete tunnel mold, arch mold sections, means at the upper ends of said arch sections by which said upper ends of said arch sections may be moved toward and away from each other, and vertically movable tracks on which said arch sections may be conveyed longitudinally of the mold.

7. In a concrete tunnel mold, arch mold sections, vertically movable tracks on which said arch sections may be conveyed longitudinally of the mold, and movable supports for said tracks permitting release of the tracks from the arch sections.

8. In a concrete tunnel mold, arch mold sections, vertically movable tracks supporting said arch sections and on which they may be conveyed longitudinally of the mold, means for raising and lowering said tracks, and pivotally supported hangers supporting said tracks.

9. In a concrete tunnel mold, arch mold sections, adjusting rods at the upper ends of said arch sections whereby they may be moved toward and away from each other, and vertically movable tracks on which said arch sections may be conveyed.

CHAS. H. WITTHOEFFT.

In the presence of—
A. J. McCauley,
E. B. Linn.

---

Copies of this patent may be obtained for five cents each, by addressing the "Commissioner of Patents, Washington, D. C."